(12) United States Patent
Barrett et al.

(10) Patent No.: US 10,295,255 B2
(45) Date of Patent: May 21, 2019

(54) CRYOGENIC ADSORPTION PROCESS FOR XENON RECOVERY

(71) Applicants: Philip A. Barrett, Tonawanda, NY (US); Neil A. Stephenson, East Amherst, NY (US); Nicholas R. Stuckert, Grand Island, NY (US); Michael Freiert, Tonawanda, NY (US); Hai Du, Hinsdale, IL (US); Rachael A. Masin, East Amherst, NY (US); Garrett R. Swindlehurst, Buffalo, NY (US)

(72) Inventors: Philip A. Barrett, Tonawanda, NY (US); Neil A. Stephenson, East Amherst, NY (US); Nicholas R. Stuckert, Grand Island, NY (US); Michael Freiert, Tonawanda, NY (US); Hai Du, Hinsdale, IL (US); Rachael A. Masin, East Amherst, NY (US); Garrett R. Swindlehurst, Buffalo, NY (US)

(73) Assignee: PRAXAIR TECHNOLOGY, INC., Danbury, CT (US)

(*) Notice: Subject to any disclaimer, the term of this patent is extended or adjusted under 35 U.S.C. 154(b) by 323 days.

(21) Appl. No.: 15/244,359

(22) Filed: Aug. 23, 2016

(65) Prior Publication Data
US 2018/0058758 A1    Mar. 1, 2018

(51) Int. Cl.
*B01D 53/04* (2006.01)
*F25J 3/04* (2006.01)
(Continued)

(52) U.S. Cl.
CPC ........ *F25J 3/0685* (2013.01); *B01D 53/0462* (2013.01); *B01J 20/186* (2013.01);
(Continued)

(58) Field of Classification Search
CPC .......... B01D 53/0462; B01D 2253/106; B01D 2253/108; B01D 2257/11;
(Continued)

(56) References Cited

U.S. PATENT DOCUMENTS

| 3,971,640 A | 7/1976 | Golovko |
| 4,656,757 A * | 4/1987 | Oschmann ............ F26B 21/083 34/473 |

(Continued)

FOREIGN PATENT DOCUMENTS

EP    1316357    6/2003

*Primary Examiner* — Frank M Lawrence, Jr.
(74) *Attorney, Agent, or Firm* — Ralph J. Mancini

(57) ABSTRACT

An adsorption process for xenon recovery from a cryogenic liquid or gas stream is described wherein a bed of adsorbent is contacted with the aforementioned xenon containing liquid or gas stream and adsorbs the xenon selectively from this fluid stream. The adsorption bed is operated to at least near full breakthrough with xenon to enable a deep rejection of other stream components, prior to regeneration using the temperature swing method. Operating the adsorption bed to near full breakthrough with xenon, prior to regeneration, enables production of a high purity product from the adsorption bed and further enables oxygen to be used safely as a purge gas, even in cases where hydrocarbons are co-present in the feed stream.

24 Claims, 10 Drawing Sheets

(51) Int. Cl.
*F25J 3/06* (2006.01)
*C01B 23/00* (2006.01)
*B01J 20/18* (2006.01)
*B01J 20/34* (2006.01)
*B01J 20/30* (2006.01)

(52) U.S. Cl.
CPC ....... *B01J 20/3092* (2013.01); *B01J 20/3408* (2013.01); *B01J 20/3458* (2013.01); *C01B 23/0068* (2013.01); *C01B 23/0078* (2013.01); *F25J 3/0695* (2013.01); *B01D 2253/106* (2013.01); *B01D 2253/108* (2013.01); *B01D 2257/11* (2013.01); *B01D 2257/402* (2013.01); *B01D 2257/702* (2013.01); *B01D 2259/40056* (2013.01); *B01J 2220/56* (2013.01); *C01B 2210/007* (2013.01); *C01B 2210/0037* (2013.01); *F25J 2205/68* (2013.01); *F25J 2205/70* (2013.01); *F25J 2215/36* (2013.01); *Y02C 20/10* (2013.01); *Y02P 20/153* (2015.11)

(58) Field of Classification Search
CPC ........ B01D 2257/402; B01D 2257/702; B01D 2259/40056; B01J 20/18; B01J 20/34; C01B 23/0068; C01B 23/0078; C01B 2210/0037; C01B 2210/007; F25J 3/0685; F25J 3/0695; F25J 2205/68; F25J 2205/70; F25J 2215/36
USPC .......................... 95/115, 127; 210/660, 670
See application file for complete search history.

(56) References Cited

U.S. PATENT DOCUMENTS

| | | | |
|---|---|---|---|
| 4,874,592 A | 10/1989 | Shino et al. | |
| 5,039,500 A | 8/1991 | Shino et al. | |
| 5,591,417 A * | 1/1997 | Buchanan | B01D 53/04 423/210 |
| 6,658,894 B2 | 12/2003 | Golden et al. | |
| 7,824,472 B2 * | 11/2010 | Urakami | B01D 53/053 95/100 |
| 2003/0000385 A1 * | 1/2003 | Kawai | B01D 53/047 95/96 |
| 2012/0079939 A1 * | 4/2012 | Johnson | B01D 53/0476 95/97 |

\* cited by examiner

CRYOGENIC ADSORPTION PROCESS FOR XENON RECOVERY

FIELD OF THE INVENTION

The invention generally relates to an adsorption process for xenon recovery from a cryogenic liquid or gas stream wherein a bed of adsorbent is contacted with a xenon containing liquid or gas stream and adsorbs the xenon selectively from the gas stream. The adsorption bed is maintained on feed until the effluent xenon concentration is equal to or greater than 70% of the inlet xenon concentration, which enables a deep rejection of other stream components, prior to regeneration using the temperature swing method. Operating the adsorption bed in this fashion, prior to regeneration, enables production of a high purity product from the adsorption bed and further enables oxygen to be used safely as a purge gas, even in cases where hydrocarbons are co-present in the feed stream.

BACKGROUND OF THE INVENTION

Maintaining the adsorption bed on feed until the Xe concentration at the outlet of the bed is greater than or equal to 90% of the inlet concentration, enables the process to be operated under conditions wherein oxygen can be used safely as a purge fluid for the temperature swing adsorption process. Moreover in this way, the bed can be operated under pressure and temperature conditions where other gases can co-adsorb. This serves to extend the range of process conditions useable for the inventive process, versus those of the prior art.

In U.S. Pat. No. 5,039,500 to Shino et al, as an example, discloses a process for producing high purity xenon with liquid oxygen from a main condenser of an air separation unit. In the process of Shino et al, the liquid oxygen stream, containing xenon, krypton and hydrocarbons is first gasified before being contacted with an adsorbent at a preselected temperature and pressure so as to adsorb on the adsorbent xenon, but not oxygen, krypton or hydrocarbons contained in the oxygen stream. The adsorbent is regenerated using a purge gas and by heating. The basic adsorption process can be augmented by other unit operations to increase the purity of the xenon, including a solid-gas separating column, a catalyst column, a moisture and $CO_2$ removal column and so on. A disadvantage of this process is that the liquid feed stream from the cryogenic plant must be converted to a gas stream prior to being contacted with the adsorbent bed. Moreover from claim 1, the adsorption process must be operated under preselected temperature and pressure conditions such that xenon is adsorbed and the krypton, hydrocarbon and oxygen are not. This places limitations on the operating conditions for the process. From embodiment 1 (column 3, lines 20-48) however, it appears this approach of identifying pressure and temperature conditions, where xenon is adsorbed and oxygen, krypton and hydrocarbons are not, was only partially successful. In this embodiment, a silica gel adsorbent was contacted until Xe breakthrough was achieved with a gasified stream at −170° C. containing 31 ppm xenon, 70 ppm krypton and 38 ppm methane and low concentrations of other hydrocarbons in an oxygen matrix. After the gas was heated to 120° C. to regenerate the adsorbent, the effluent concentrations became 1.4% xenon, 0.14% krypton, 0.066% hydrocarbon and balance oxygen. The fact that the krypton, and hydrocarbons became significantly enriched beyond their feed concentration, in the same way as the xenon, suggests that these components were also adsorbed under the conditions used for the adsorption feed step, in an apparent contradiction with the process as claimed. It is likely therefore that due to this co-adsorption of other components, especially the hydrocarbon components and their enrichment by adsorption, that later embodiments employ a catalyst column to remove these hydrocarbons and a $CO_2$ and moisture removal column thereafter, to remove the products of hydrocarbon combustion over the catalyst. By contrast, in the present adsorption process the feed stream can be liquid or gas phase and during the purging and heating steps, employed to recover the xenon product, the concentration of krypton and hydrocarbons is much less than their concentrations in the feed. In the art of Shino et al, as clarified in embodiment 1, 38 ppm methane and low concentrations of other hydrocarbons in the feed, became 0.066% or 660 ppm during the heating step used to regenerate the adsorbent bed. This is an enrichment of approximately 17 times the concentration of hydrocarbons in the feed.

U.S. Pat. No. 4,874,592 also to Shino et al, discloses an adsorption-desorption process, wherein xenon is concentrated from a vented liquid oxygen stream by successive stages of adsorption and desorption and wherein the hydrocarbons are removed catalytically from the xenon gas stream recovered after the first adsorption stage. From examples 1 and 2 and as shown in FIGS. 1 and 2 of U.S. Pat. No. 4,874,592, the vented rare gas containing stream from a rectifying column, is introduced into a first adsorption column, where a silica gel adsorbent, capable of selectively adsorbing the xenon is allowed to saturate. The product stream from this first adsorption column is collected by reducing the pressure and by heating the column. The product stream contained a mixture of xenon, krypton and hydrocarbons in enriched concentrations above the feed composition. A catalyst unit operation and subsequent carbon dioxide and water removal column were used for hydrocarbon removal, prior to a second adsorption column, employed to increase the purity of the rare gas products still further. As clarified in Example 1 of this patent, venting the liquid oxygen stream generates a gaseous oxygen feed stream to the adsorption system. As described above, the adsorption process of the present invention is compatible with either a liquid or a gas feed and therefore the step of venting the liquid oxygen is not required. Moreover, the present process is operated such that enrichment of the hydrocarbons beyond their concentration in the feed stream is avoided, and therefore a step of catalytic oxidation, as described in the prior art is not required.

U.S. Pat. No. 6,658,894 to Golden et al, discloses a process of recovering at least one of xenon or krypton from and oxygen-containing gas stream by selectively adsorbing the xenon and/or krypton using a zeolite of type X exchanged with Li and Ag. According to Example 7, which showcases the key steps in the process of Golden et al, a liquid oxygen stream containing 17 ppm xenon, 95 ppm methane, and 10 ppm nitrous oxide was passed through a silica gel bed wherein the nitrous oxide was removed. The nitrous oxide free effluent was vaporized to 113 K and a portion of this gas stream was sent to a bed containing the type X zeolite exchanged with lithium and silver. The breakthrough of methane was detected after 190 minutes on stream, whereas after 1400 minutes on stream, no breakthrough of xenon had occurred. At this point, the feed step was stopped and regeneration was started using a nitrogen purge gas at 113 K. From the data in FIG. 4 of the Golden et al patent, the methane concentration during desorption increased to a maximum of between 8000-9000 ppm. The xenon product was collected by further warming the adsorption bed. Key features of the art of Golden et al are:

Use of the type X zeolite exchanged with both Li and Ag.
Operation of the adsorption process to the point where breakthrough of xenon was not observed.
Desorption under nitrogen, wherein the methane concentration at the outlet significantly exceeds the methane concentration in the feed stream (95 ppm versus 8000 to 9000 ppm).

In the process of the present invention, the methane levels during desorption do not show this enrichment behavior observed in the data presented in Golden et al. Moreover, the present process can be operated in a liquid phase and a Li and Ag type X zeolite is not required.

U.S. Pat. No. 3,971,640 to Golovko discloses an adsorption process for recovering a krypton-xenon concentrate from an air stream. In the process of Golovko, a gaseous air stream at 90-110K containing admixtures of krypton, xenon and hydrocarbons is passed through an adsorbent having pore-openings from 5-150 Å, during which time the krypton, xenon, nitrogen, oxygen and hydrocarbons are adsorbed. The feed step is ended when krypton is detected at the outlet of the adsorber. At this point, a staged temperature desorption wherein the temperature is raised firstly from 90-110 K to 250-280 K wherein xenon, krypton, oxygen, nitrogen and hydrocarbons are desorbed from the adsorbent and thereafter the bed is heated further from 250-280 K to 500-650 K with the desorbed products at this point discarded to atmosphere. Unlike the process of Golovko et al, during the desorption step of the process of the invention, substantially only xenon and oxygen are desorbed with any additional components, such as hydrocarbons, are desorbed at concentrations significantly less than their concentration in the feed stream. From example 2 in Golovko, hydrocarbon levels of 2% were measured during desorption which again suggests significant adsorption and concentration of these hydrocarbons by adsorption which does not take place in our process. Moreover in the present process, the use of staged desorption temperatures up to 500-650 K is not required.

SUMMARY OF THE INVENTION

An adsorption process for xenon recovery from a cryogenic liquid or gas stream is described wherein a bed of adsorbent is contacted with the aforementioned xenon containing liquid or gas stream and adsorbs the xenon selectively from this fluid stream. The adsorption bed is operated to at least near full breakthrough with xenon to enable a deep rejection of other stream components, prior to regeneration using the temperature swing method. Operating the adsorption bed to near full breakthrough with xenon, prior to regeneration, enables production of a high purity product from the adsorption bed and further enables oxygen to be used safely as a purge gas, even in cases where hydrocarbons are co-present in the feed stream.

DETAILED DESCRIPTION OF THE FIGURES

FIG. 1 is a schematic illustrating process steps for 1-bed adsorption process with liquid feed and purge during steps 1 and 2, respectively.

Figure 4A:
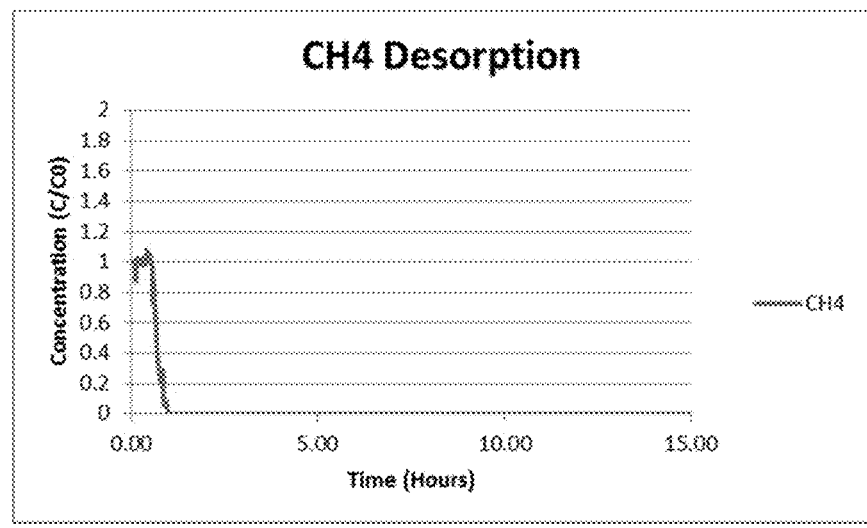
FIG. 4a show the concentration profiles at the outlet of the adsorbent bed versus time for the liquid oxygen purge and regeneration and Xe recovery steps for $CH_4$ desorption.
Figure 4B:
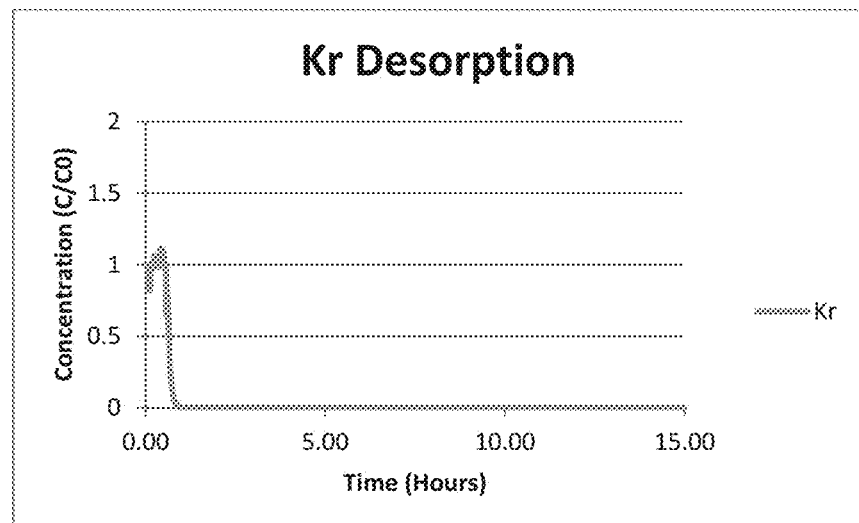

FIG. 4b plots concentration profiles at the outlet of the adsorbent bed versus time for the liquid oxygen purge and regeneration and Xe recovery steps for Kr desorption.

Figure 4C:
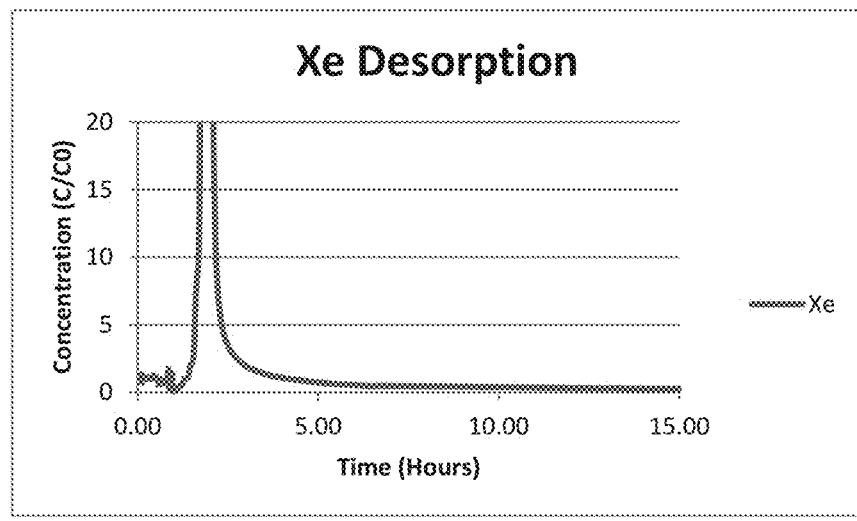

FIG. 4c plots concentration profiles at the outlet of the adsorbent bed versus time for the liquid oxygen purge and regeneration and Xe recovery steps for Xe desorption.

Figure 5:
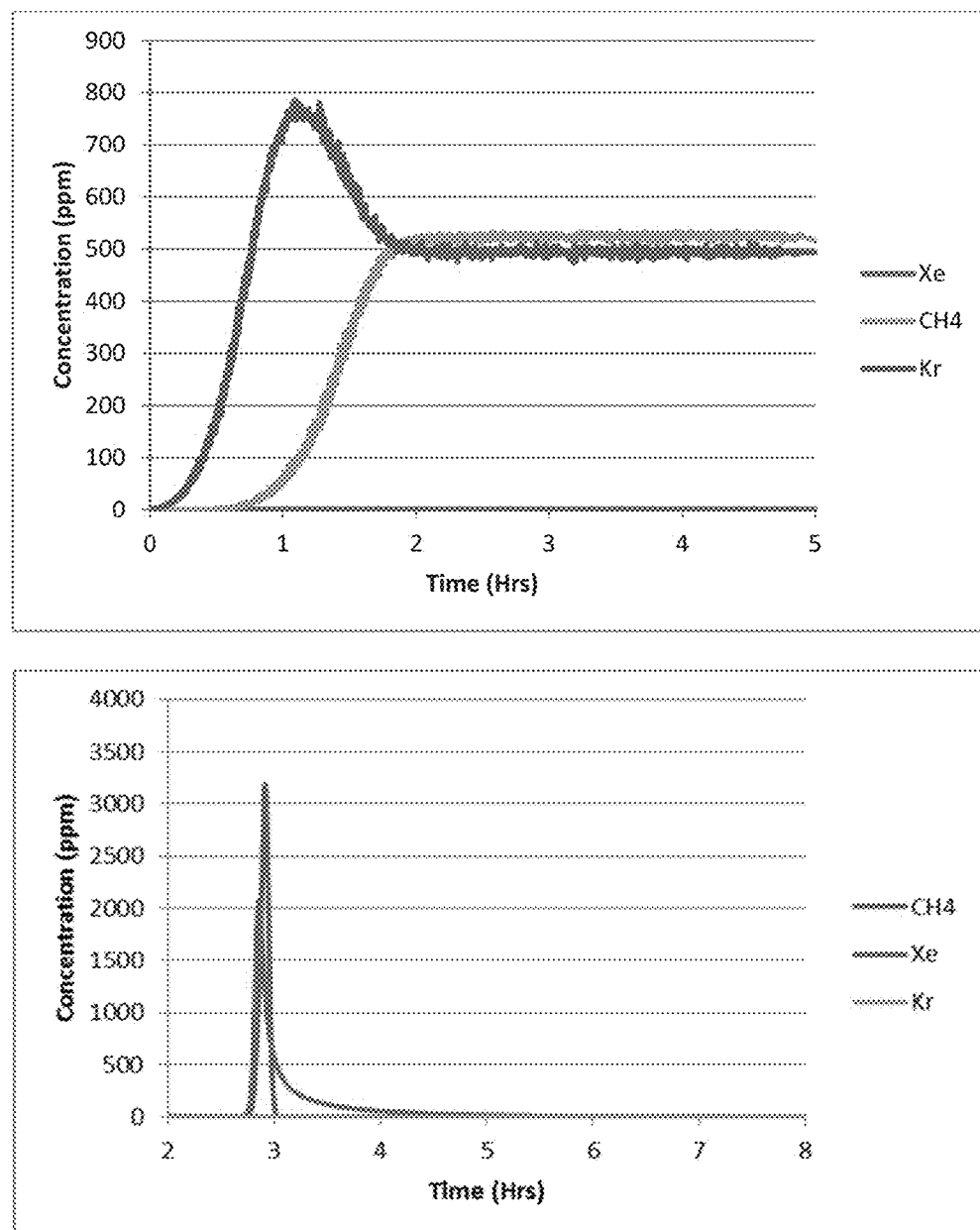

FIG. 5 shows concentration profiles at the outlet of the adsorbent bed during gas phase stripping step for comparative example 1 showing that the Xe outlet concentration criterion was unmet (top) and that significant amounts of methane, exceeding the feed concentration, were desorbed together with xenon during bed warming (bottom).

Figure 6:
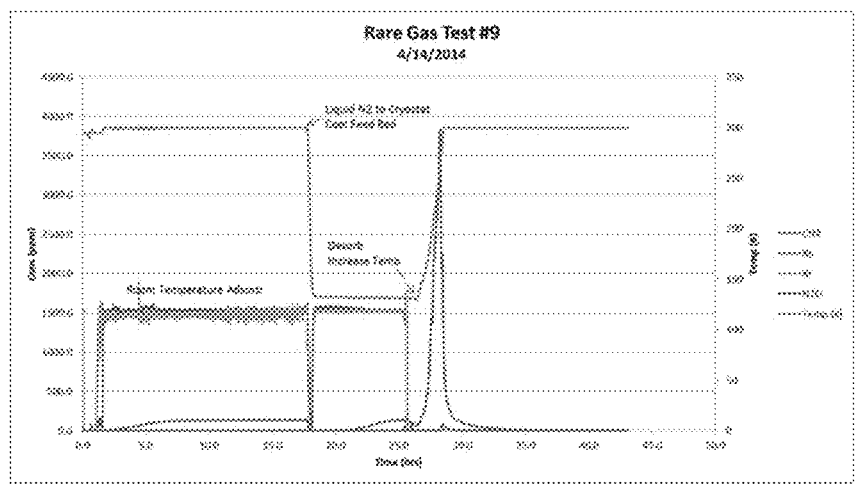

FIG. 6 shows concentration profiles at the outlet of the adsorbent bed during room temperature gas stripping step, low temperature gas stripping step (130 K), purge and Xe recovery and bed regeneration.

Figure 7:
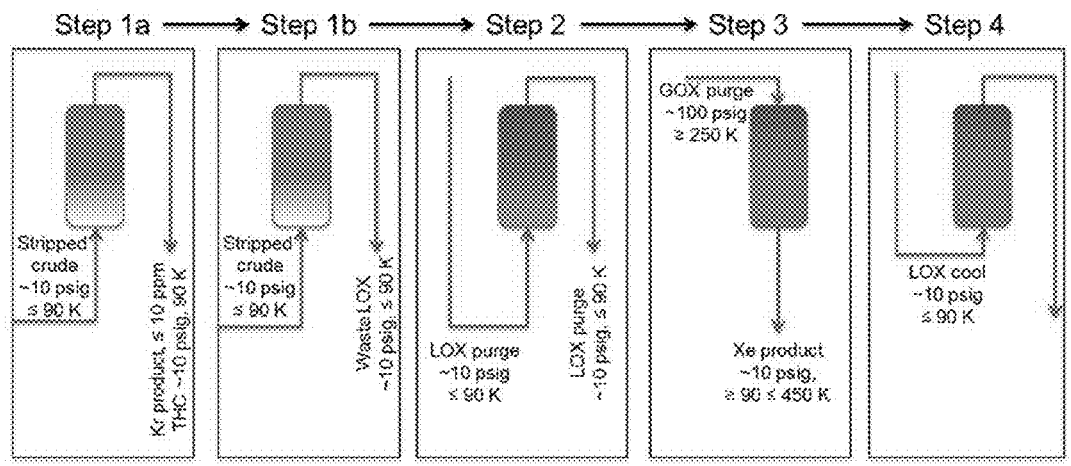

FIG. 7 schematically illustrates the Kr and Xe recovery process steps for a 1-bed adsorption process with liquid feed and purge during steps 1a, 1b and 2, respectively.

Figure 8:
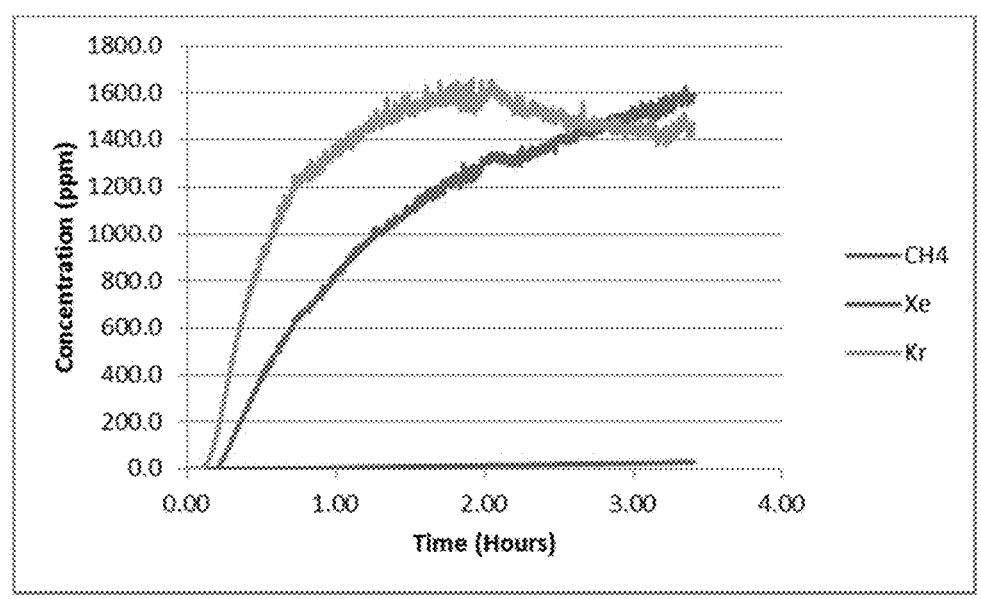

FIG. 8 shows concentration profiles at the outlet of the adsorption bed versus time for Kr and $CH_4$ during the feed step.

DETAILED DESCRIPTION OF THE INVENTION

The present invention relates to an adsorption process for xenon recovery from a cryogenic oxygen fluid stream which can be operated under conditions wherein oxygen may be used safely as a purge gas during regeneration and wherein the process can be operated under pressure and temperature conditions which favor the adsorption of xenon, as well as other components.

In one embodiment, the invention relates to an adsorption process for recovery of xenon from a cryogenic oxygen fluid stream wherein:

1. An adsorbent bed at cryogenic temperature, having an inlet and an outlet, is contacted with a fluid feed stream comprising oxygen, xenon and at least one other adsorbable component, such as krypton and/or methane. The adsorbent bed is maintained on feed until the xenon concentration at the outlet of the bed is greater than or equal to 70% of the xenon concentration at the inlet of the bed; in another embodiment greater than or equal to 80% of the xenon concentration at the inlet of the bed, and in yet another embodiment greater than or equal to 90% of the xenon concentration at the inlet of the bed. The reason for maintaining the adsorbent bed on feed until the concentration levels of xenon at the outlet of the bed is above certain concentration levels is to achieve deep rejection of all unwanted components especially hydrocarbons from the bed. More particularly, as xenon adsorbs more strongly on the adsorbent than light hydrocarbons commonly present in cryogenic rare gas streams, maintaining the bed on feed until the xenon concentration at the outlet of the bed is greater than or equal to 70% of the xenon concentration at the inlet of the bed forces any hydrocarbons adsorbed on the adsorbent to be replaced by xenon and thereby achieves deep rejection of hydrocarbons from the bed. Examples of such hydrocarbons include, but is not limited to methane, ethane, propane, ethylene and combinations thereof. For obvious safety reasons it is detrimental to enrich oxygen based fluid feed streams with greater than nominal concentrations of C1-C3 hydrocarbons which can occur in the adsorbent bed should the outlet concentration criterion be unmet.

2. At this point, the feed step is ended and the adsorbent bed is purged with a purge gas to remove hydrocarbons and other adsorbable components primarily from the non-selective void spaces of the bed. The purge gas generally comprises oxygen, nitrogen, argon and/or mixtures thereof. In one embodiment the purge gas is substantially free of xenon and/or other adsorbable components.

3. Increasing the temperature of the adsorbent bed to a sufficient temperature to desorb the xenon product which can be collected as is and/or further processed to increase its purity still further.

4. Cooling the adsorption bed to cryogenic temperatures with a cryogenic fluid. In one embodiment the cryogenic fluid is substantially free of xenon and other adsorbable components. In another embodiment the cryogenic fluid comprises oxygen gas and/or liquid.

5. Repeating steps 1-4 in a cyclic manner.

The process of the invention can be operated utilizing one or more adsorption beds and can be used in conjunction with other adsorbents and/or processes which can help simplify the feed stream to the xenon recovery adsorbent material, such as a gel trap or a guard bed. Useful adsorbents include zeolites ion exchanged with silver having low silica to alumina ratio, <3 and a pore large enough to adsorb xenon. Non-limiting examples of adsorbents useful in the process of the invention include silver ion exchanged zeolite of type X or LSX (where LSX denotes the low silica variant of type X zeolite), wherein the ion exchange level is at least 80% Ag on an equivalents basis; in another embodiment at least 90% Ag on an equivalents basis.

The adsorption process of the invention recovers xenon primarily from a fluid stream (liquid or gas phase), without producing a product that is also enriched in hydrocarbons, above and beyond their concentration in the feed stream. In fact, when operated in a preferred manner, the hydrocarbon content in the xenon product stream is reduced to less than or equal to 50 ppm, and preferably less than or equal to 1 ppm, from a feed containing up to 2000 ppm. When the adsorbent is far away from saturation i.e. full breakthrough is not achieved, then the adsorbent will adsorb the next best thing which our data shows includes hydrocarbons, including methane. As more xenon is introduced into the bed, the methane is displaced and released from the adsorbent so that it can be purged out. Operating the adsorbent to full breakthrough ensures that there is no capacity left in the adsorbent for hydrocarbons such as methane and therefore the only source of same and other hydrocarbons will be the void spaces between the adsorbent particle and elsewhere in the adsorbent bed. By purging this void space methane/other hydrocarbons are effectively removed thereby reducing potential hazards during the collection step for the xenon product.

By virtue of the deep hydrocarbon rejection achieved by the present adsorption process, complicated desorption protocols or the use of inert purge gases such as nitrogen and/or the addition of other unit operations, such as catalytic hydrocarbon removal is avoided. Furthermore, our ability to process cryogenic liquid oxygen containing feed streams avoids the need for vaporization, which when hydrocarbons are present, can pose safety concerns from their concentration in the oxygen fluid during vaporization.

One economic advantage of the invention stems from the simplicity of the process and therefore the need for less capital equipment. For example, the ability to process a liquid feed stream negates the need for a vaporizer to convert the liquid to gas. The ability to use an oxygen purge gas means less tie-ins and/or supplemental lines, for example addition of a nitrogen line as per the art of Golden et al, is not required. The lack of hydrocarbons in the product also simplifies the downstream processing meaning additional capital equipment, such as a catox and downstream pre-purifier to remove the products of combustion are not required either.

In another embodiment the invention relates to an adsorption process for deep rejection of hydrocarbons to 50 ppm or less in the product and recovery of xenon at concentrations $\geq 1\%$ from a cryogenic oxygen fluid feed stream comprising at least ppm levels of xenon and hydrocarbon. Other species, including carbon dioxide, nitrous oxide, and krypton may also be present in the feed stream. An example of a suitable fluid stream comprises:

Xe 1-200 ppm, in another embodiment 20-180 ppm, in another embodiment 50-150 ppm
Kr 500-2000 ppm
Hydrocarbons (as methane) 500-2000 ppm
$N_2O$ 0-100 ppm
$CO_2$ 0-100 ppm
0-1200 ppm Ar
Ppm amounts of other atmospheric gases including $N_2$ and
Balance $O_2$ The above oxygen-rich stream is preferably at cryogenic temperatures of $\leq 120$ K, in another embodiment $\leq 90$ K and pressurized to at least 10 psig. If the oxygen-rich stream contains components that are more strongly adsorbed than Xe, such as $CO_2$ and $N_2O$, it is preferred that these species are substantially removed firstly before contacting the feed stream with the main adsorption bed by use of a gel trap, guard bed and/or layer of adsorbent within the main adsorption vessel which houses the adsorbent for Xe recovery. A suitable adsorbent for removal of these strongly adsorbing species is a silica gel. In one embodiment the silica gel is shaped into a form compatible with a packed bed adsorption process, such as granular, or beaded. In another embodiment the average particle size of the shaped material is at least 0.5 mm and not more than about 5 mm. In one embodiment the adsorbent for Xe recovery is an Ag exchanged zeolite, in another embodiment an AgX zeolite, wherein the degree of Ag exchange is at least 80%, in another embodiment at least 90% on an equivalents basis. The AgX zeolite is also advantageously deployed as shaped particles, wherein beads, extrudates or granular materials may be used. The average particle size is also advantageously at least 0.5 mm and not more than about 5 mm.

In a further embodiment the process of the invention can be practiced with two or more adsorption vessels. The adsorption vessels can be of any known type, including vertical flow vessels, horizontal flow vessels, lateral flow vessels, or radial flow vessels. When the process of the invention is practiced with two or more vessels, the phasing of operation of the beds can be varied such that the on-line period of the first bed begins when the second bed comes off-line such that there is a minimal fluctuation in output. Alternatively, the cycles may be phased so that there are overlaps between the on-line periods of the beds.

Adsorption Process Description: Xenon Recovery Adsorption Bed

Step 1: Stripping Step

An adsorbent bed containing an adsorbent selective for Xe is pre-cooled to $\leq 120$ K, in another embodiment $\leq 90$ K, with a cryogenic oxygen fluid. A feed stream is provided also at $\leq 120$ K, in another embodiment $\leq 90$ K and at a pressure of about 10 psig containing at least ppm levels of Xe and hydrocarbons in an oxygen matrix. The adsorbent which is selective for Xe, gradually saturates with Xe as the flow of the feed stream is continued. The feed step is intentionally continued until the Xe concentration at the outlet of the bed is at least 70%, in another embodiment at least 80%, in another embodiment at least 90% and in yet another embodiment at least 95% of the Xe concentration at the inlet of the bed. At this point, the feed flow is ended.

Step 2: Purge Step

Once the criterion for ending Step 1 of having a Xe concentration at the outlet of the bed be at least 70%, in another embodiment at least 80%, in another embodiment at least 90% and in yet another embodiment at least 95% of the Xe concentration at the inlet of the bed is achieved, the bed is purged with a suitable purge gas selected from the group oxygen, nitrogen, argon or mixtures thereof at ≤120 K to remove hydrocarbons and Xe from the non-selective voids present in the adsorbent bed. This purge step should be continued until the hydrocarbon levels at the outlet of the adsorbent bed are ≤50 ppm; in another embodiment ≤10 ppm and in yet another embodiment ≤1 ppm.

Step 3: Regeneration and Xe Recovery

At this point, the temperature of the adsorbent bed can be increased from cryogenic temperatures to at least 250 K and up to 450 K in order to recover a Xe product at ≥1% concentration and containing at most 50 ppm hydrocarbon, measured as methane equivalent. The temperature can be raised by using ambient temperature or hotter purge gas and the purity of the Xe product can be controlled through the amount of this ambient or hotter temperature purge gas employed.

Step 4: Bed Cooling

After the temperature of the adsorbent bed reaches at least 250 K and the Xe product has been recovered, the bed is cooled again to cryogenic temperatures. This is accomplished by stopping the flow of ambient or warmer temperature purge gas and contacting the adsorbent bed with a cryogenic fluid to cool the bed to ≤120 K and preferably to ≤90 K.

Steps 1-4 can be operated cyclically. It is also possible to operate this adsorption process using one or more adsorbent beds. If two adsorption beds are used, it is advantageous to operate the process wherein these two adsorbent beds are operated in a sequence, such that while bed 1 is on Step 1, bed 2 is undergoing Steps 2, 3 and 4. It is particularly advantageous to operate the 2-bed process to have bed 2 regenerated, following Steps 2, 3 and 4, before bed 1 has registered any Xe breakthrough. In this way, for a portion of Step 1, both beds 1 and 2 can be operated in series to enable the outlet Xe concentration from bed 1 to be at least 70%, in another embodiment at least 80%, in another embodiment at least 90% and in yet another embodiment at least 95% of the inlet concentration and at the same time, increase the overall Xe product purity, at acceptable recovery, when these beds are connected in series for a portion of the feed step.

Figure 1:
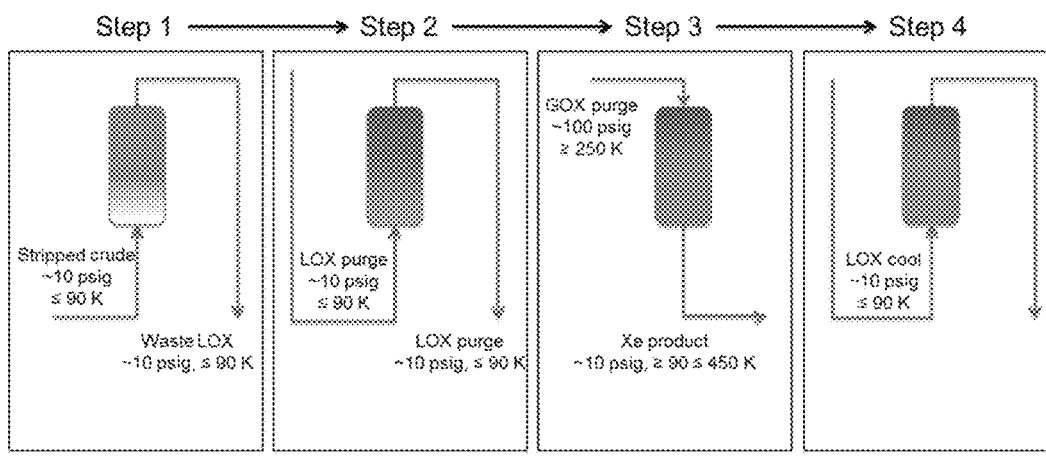

One embodiment of the invention employs oxygen as the purge gas during Steps 2 and 3 and either cryogenic oxygen gas and/or liquid oxygen as the cryogenic fluid in Step 4. This embodiment is shown schematically in FIG. 1. The use of ambient or higher temperature oxygen as the purge and liquid oxygen as the cooling fluid is advantageous from the standpoint of reducing the number of tie-ins required for the process overall. The use of warmer purge gas in Step 3 up to 450 K enables the amount of purge required to regenerate the bed to be reduced, which can help increase the purity of the Xe product, as well as allow the regeneration step to be completed in less time. A small trim heater, can be used to raise the temperature of the purge gas to temperatures above ambient as needed.

The invention will now be illustrated by the following non-limiting examples.

Examples

A total of four examples are provided to reduce the key features of the invention to practice. The examples illustrate xenon recovery from different feed streams, with both gas and liquid phase feed flow and in one embodiment, show how the basic adsorption process can be modified to recover some krypton in addition to xenon.

Example 1: Recovery of Xe from lower feed concentration liquid

Example 2: Recovery of Xe from higher feed concentration liquid

Example 3: Recovery of Xe from higher feed concentration gas

Example 4: Recovery of Kr and Xe from feed liquid

Comparative Example: Impact of not meeting Xe breakthrough criterion.

As the examples demonstrate, the invention can be practiced using either gas or liquid phase feed during the stripping step (Step 1), as required. Examples 1 and 2 are liquid phase experiments, and Example 3 is a gas phase experiment. Furthermore the subject process can be adapted to allow for some krypton recovery in addition to xenon (Example 4).

Example 1: Xe Recovery from Feed Liquid Containing 50 ppm Xe, 500 ppm $CH_4$, Balance $O_2$ 5.568 g of AgLSX beads having an average particle size of 0.6 mm (99% exchanged with Ag, on an equivalents basis, balance Na) were packed into a stainless steel adsorption bed (0.62" ID×3.5" height) equipped with an inlet and an outlet, as well as a thermocouple placed near the midpoint of the adsorbent bed for temperature measurements. The AgLSX adsorbent was activated at 350° C. for 4 hours under dry nitrogen to reduce the residual moisture content to ≤0.5 wt % as measured by the Karl Fischer titration method. This now activated adsorbent bed was placed inside a liquid nitrogen cooled cryostat from Oxford Instruments, wherein the temperature of the adsorbent bed could be controlled to within ±1° C. throughout the temperature range 77-300 K. The inlet of the adsorbent bed was connected to a manifold enabling either the feed containing 50 ppm Xe, 493 ppm $CH_4$, balance $O_2$ to be flowed through the adsorbent bed or UHP grade $O_2$ employed as the purge fluid to be flowed through the adsorbent bed. The pressure in this test apparatus was controlled using a back pressure regulator placed after the adsorbent bed on the outlet line. Unless otherwise specified the pressure during the stripping step was 100 psig and 50 psig during the purge steps and temperature swing bed regeneration. An Omnistar residual gas analyzer (RGA) with 200 atomic mass units range from Pfeifer Vacuum AG was employed to measure the composition of the gas exiting the bed with a time resolution of about 0.1 minutes per data point. This test apparatus was completed by valves enabling the feed and/or purge fluids to be passed through the adsorbent bed in either co-current or counter-current flow paths. A bypass loop was also included to enable the bed to be bypassed to enable the feed composition to be measured at any time, as well as to facilitate the calibration of the RGA. This apparatus was employed to measure breakthrough curves for all non-$O_2$ components, including Xe and $CH_4$ as well desorption concentration profiles for all non-$O_2$ components. The purpose of the desorption curves was to detect whether the $CH_4$ removed during the Xe recovery Step 3 met the needs of the process (e.g. $CH_4$ concentrations ≤50 ppm).

Figure 2:
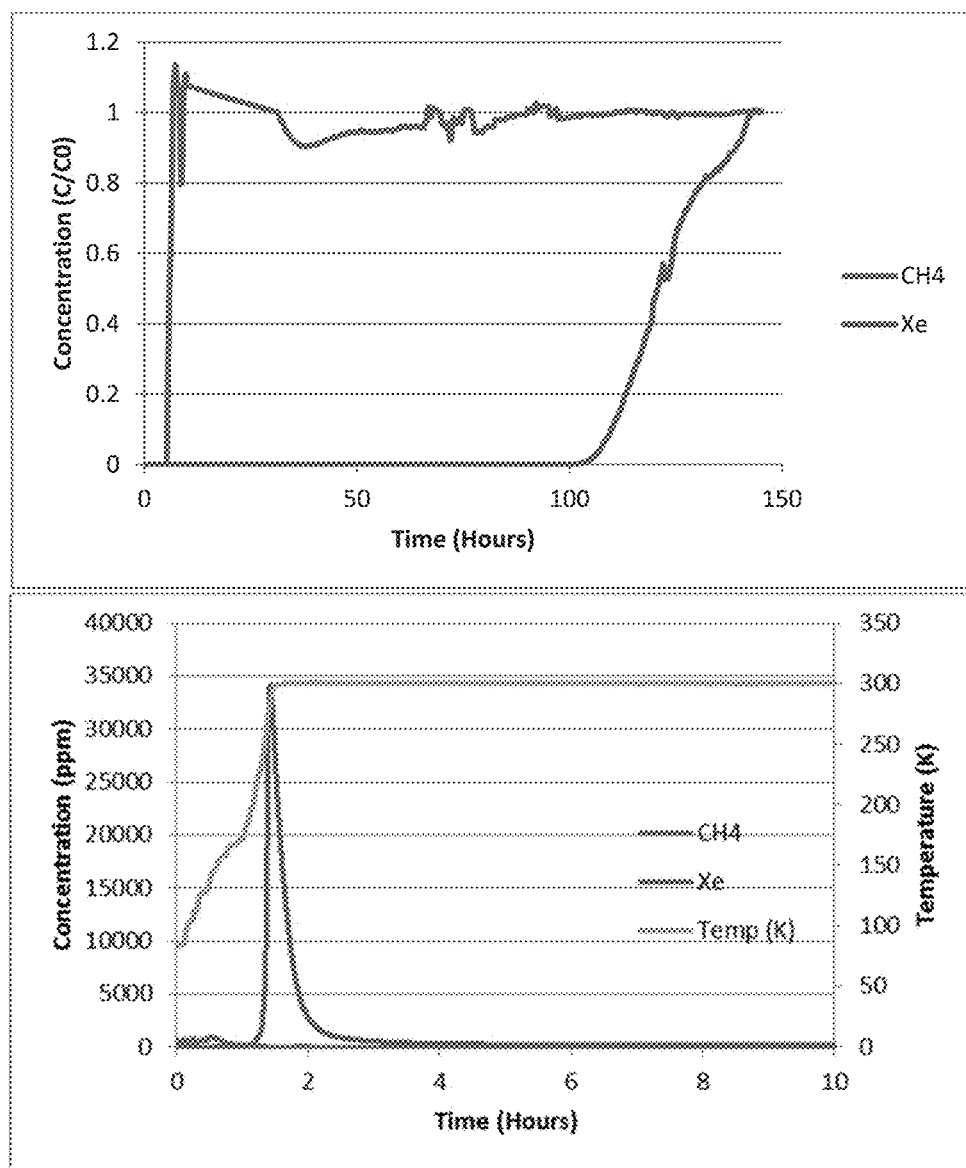
FIG. 2 shows the concentration profiles at the outlet of the adsorbent bed for $CH_4$ and Xe during feed (Top) and desorption (Bottom).

The adsorbent bed was purged with UHP $O_2$ to remove any atmospheric contaminants prior to being cooled to 86 K and pressurized to 100 psig using the UHP $O_2$ at a gas equivalent flow rate of 1.5 SLPM. When the bed was at temperature, the feed mix containing Xe and $CH_4$ was contacted with the adsorbent bed at the same pressure, temperature and flow conditions. After 5 hours, the RGA detected an initial breakthrough of $CH_4$. The $CH_4$ concentration reached the inlet feed concentration after ~6.5 hours of feed time. At this point in time, no Xe breakthrough had occurred. The feed flow was continued and initial breakthrough of Xe was measured after 100.5 hours. Breakthrough of Xe to the inlet concentration of 50 ppm ($C/C_0$=1.0) was achieved after 145 hours of feed time. At this point, the feed flow was ended and a flow of UHP $O_2$ at 0.5 SLPM was initiated to clean the non-selective voids in the bed and piping of Xe and $CH_4$ feed components. At the same time, the bed temperature was increased to 130 K. Once the $CH_4$ concentration was <100 ppm, the adsorbent bed was heated from 130 K to 300 K at a rate of 2 K/min, the adsorption bed pressure was reduced to 50 psig and the Xe was desorbed from the adsorbent bed under $O_2$ purge. At the start of the actual Xe desorption, the $CH_4$ concentration was 1 ppm and dropped to 0 ppm after 1.2 hours. The Xe desorption was essentially complete after 6 hours when the temperature had reached ~300 K. The concentration profiles for the feed and desorption steps are shown in FIG. 2.

Figure 3:
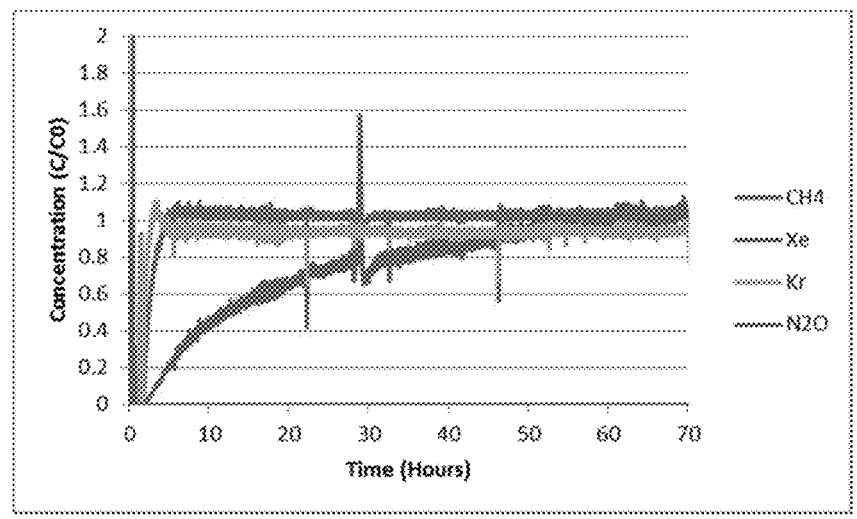
FIG. 3 show concentration profiles at the outlet of the adsorbent bed versus time for $CH_4$, Xe, Kr and $N_2O$ during the stripping step.

Example 2: Xe Recovery from Feed Liquid Containing 150 ppm Xe, 1500 ppm Kr, 1540 ppm $CH_4$, 50 ppm $N_2O$, Balance $O_2$ The adsorbent bed from Example 1 was packed with 1.83 g of AgLSX (99% exchanged with Ag, on an equivalents basis, balance Na), having an average particle size of 1.0 mm, which only partly filled this bed. The additional space in the bed was filled-up with essentially non-adsorbing glass beads, also having an average particle size of 1.0 mm. This change was made primarily to reduce the experimental time, which exceeded 150 hours in the test described in Example 1, wherein more AgLSX adsorbent was used. The AgLSX adsorbent was activated, as described in Example 1, prior to use. As a result of the presence of $N_2O$ in the feed gas, a gel trap containing 3.54 g of Grade 40 Grace Davison Silica Gel was placed before the AgLSX adsorbent bed. Prior to use the silica gel was activated at 200° C. for 4 hours to condition this material prior to use. The purpose of the gel trap was to remove as much of the $N_2O$ as possible, in order to enable the more expensive AgLSX adsorbent to function, as demonstrated in Example 1, for Xe capture and recovery. The system was purged at ambient temperature with UHP $O_2$ to remove any atmospheric contaminants from the adsorbent bed, gel trap and associated components and piping. The pressure was set to 100 psig using the back-pressure regulator. Liquid $N_2$ was then used to cool the gel trap to an average temperature of 81.9 K. The adsorbent bed inside the cryostat (as described in Example 1) was similarly cooled, this time to an average temperature of 85.6 K still under UHP $O_2$ flow. Once the gel trap and adsorbent bed temperatures had stabilized, the feed was switched from UHP $O_2$ to the Xe containing mixture having the following composition: 150 ppm Xe, 1502 ppm Kr, 1540 ppm $CH_4$, 50 ppm $N_2O$, balance $O_2$. The flow rate was 0.5 slpm for the adsorption step. The breakthrough times to $C/C_0$=1 are given in Table 1. The concentration versus time profiles for the rare gas and contaminant components is given in FIG. 3. From these data it is clear that the Kr breakthrough occurred first, followed $CH_4$ with both of these species breaking through in <5 hours. By contrast, the Xe took over 52 hours to full breakthrough. No $N_2O$ was detected at the outlet during this adsorption step.

TABLE 1

Breakthrough times for rare gases and impurities.

| Component | Feed Concentration (ppm) | Breakthrough Time to $C/C_0$ = 1 (Hours) |
|---|---|---|
| Kr | 1500 | 2.8 |
| $CH_4$ | 1540 | 4.8 |
| Xe | 150 | 52.1 |
| $N_2O$ | 50 | N/A |

Next, the feed of the rare gas containing mixture was ended and a purge with UHP $O_2$ was initiated at 0.5 slpm and with the system pressure reduced to 50 psig, to purge the adsorbent bed and associated piping of any traces of the rare gas containing mixture from the voids and other non-selective spaces. During the purge step the adsorbent bed temperature was gradually increased to 130 K. The purge duration was 60 minutes before the temperature of the adsorbent bed was once increased gradually to room temperature to desorb the adsorbed Xe. During the desorption step, the UHP $O_2$ purge flow rate was lowered to 0.1 slpm. The bulk of the Xe desorbed after about 2 hours when the adsorbent bed temperature had reached approximately 250 K (See FIG. 4*a*-4*c*).

Examples 1 and 2 both show the results achievable from following the process steps, disclosed herein and by using the preferred AgX adsorbent for xenon recovery. In these two examples, the feed compositions were different in terms of both the xenon concentration, as well as the amount and type of impurities. Despite these feed compositional differences, the test data clearly shows that the AgX adsorbent, adsorbs the xenon component preferentially during the liquid phase stripping step (Step 1). The purge with oxygen (Step 2) showed that the void spaces in the bed and piping can be readily cleaned of feed components at the end of Step 1. Warming the bed, as described in Step 3, leads to recovery of xenon with enrichment from low ppm to percent levels and wherein the hydrocarbon levels in the product were ≤1 ppm in both cases. The final cooling step (Step 4) was performed first in these two experiments, in order to bring the adsorbent bed and any gel traps or guard beds, required for removal of strongly adsorbing contaminants, such as $CO_2$ and $N_2O$, to cryogenic temperatures, before the stripping step (Step 1) is initiated.

Comparative Example 1: Xe Recovery from Feed Gas Containing 49.7 ppm Xe, 500 Ppm Kr, 508 ppm $CH_4$, 49.2 ppm $N_2O$, Balance $O_2$, Wherein the Xe Breakthrough Criterion for Stripping Step is Unmet The adsorbent bed from Example 1 was packed with 1.85 g of AgLSX (99% exchanged with Ag, on an equivalents basis, balance Na), having an average particle size of 1.0 mm, which only partly filled this bed. The additional space in the bed was filled-up with essentially non-adsorbing glass beads, also having an average particle size of 1.0 mm. The AgLSX adsorbent was activated prior to use, as described in Example 1. As a result of the presence of $N_2O$ in the feed gas, a gel trap containing 2.85 g of Grade 40 Grace Davison Silica Gel was placed before the AgLSX adsorbent bed. The silica gel was activated prior to use, as described in Example 2. The purpose of the gel trap was to remove as much of the $N_2O$ as possible, as discussed in Example 2. The system was purged at ambient temperature with UHP $O_2$ to remove any atmospheric contaminants from the adsorbent bed, gel trap and associated components and piping. Liquid $N_2$ was then used to cool the gel trap to an average temperature of 81.9 K. The adsorbent bed inside the cryostat (as described in Example 1) was similarly cooled, this time to an average temperature of 130 K still under UHP $O_2$ flow and the pressure was set to 60 psig, using the back-pressure regulator, placed after the adsorbent bed. Once the gel trap and adsorbent bed temperatures had stabilized, the feed was switched from UHP $O_2$ to the Xe containing mixture having the following composition: 49.7 ppm Xe, 500 ppm Kr, 508 ppm $CH_4$, 49.2 ppm $N_2O$, balance $O_2$. The flow rate was 1.0 slpm for the adsorption step. The feed step was continued for 5 hours, by which time no Xe breakthrough had occurred (see FIG. 5). By contrast, at this point in time both Kr and $CH_4$ had fully broken through. To regenerate the bed and recover the Xe product, the following sequence of steps were used: Firstly, the adsorbent bed and piping were purged with UHP $O_2$ at 130 K and 60 psig for 3 minutes to clean at least the voids in adsorbent bed and piping of feed contaminants. After this high pressure purge, the adsorbent bed pressure was reduced to 6 psig, using the back-pressure regulator and the UHP $O_2$ purge at 130 K was continued for an additional 20 minutes. After this lower pressure purge, the flow rate was reduced to 0.1 slpm and the adsorbent bed was purged for 4 minutes with $N_2$, in an attempt to further remove contaminants from the adsorbent bed, which may be more strongly held and therefore more readily removed using more polar $N_2$ for the purge gas in place of $O_2$. After this short $N_2$ purge, a co-current $O_2$ purge was initiated for approximately 90 minutes to purge the adsorbent bed and lines free of $N_2$ which interfered with the $CH_4$ signal on the RGA analyzer. At this point, the gas was switched back to $O_2$ with the flow direction being counter-current and the temperature of the bed increased to 300 K. The flow rate was set to 0.5 slpm during the adsorbent bed warming. As shown in FIG. 5, under these conditions, the Xe reached a peak purity of 2075 ppm and the $CH_4$ peak purity was also very elevated at 3180 ppm.

In this comparative example, the teachings regarding the need to break the Xe through to at least 90% of the feed concentration and preferably at least 95% of its concentration in the feed was not followed. As a result, the purity of the Xe recovered was lower and more significantly, the $CH_4$ concentration in the Xe product exceeded its concentration in the feed gas (3180 ppm vs. 508 ppm).

Example 3: Xe Recovery from Feed Gas Containing 150 ppm Xe, 1502 ppm Kr, 1540 ppm $CH_4$, 50 ppm $N_2O$, Balance $O_2$ 1.85 g of AgLSX adsorbent, having an average particle size of 1.0 mm, was loaded into the adsorbent bed as before with the additional void space filled with glass beads, also having a 1.0 mm average particle size. The AgLSX adsorbent activated, as described in Example 1 prior to use. A gel trap was also used for this test employing 2.85 g of the same type of silica gel, as described in Example 2. The silica gel was activated, as described in Example 2. The entire test apparatus including the gel trap, adsorbent bed and all associated piping were purged at room temperature with UHP $O_2$ to remove any atmospheric contaminants, prior to starting the test. The pressure was set to 100 psig, using the back-pressure regulator. The gel trap was cooled to an average temperature of 81.9 K, still under a flow of UHP $O_2$. The adsorbent bed was intentionally left at room temperature, to study the amount of Xe capture under ambient temperature conditions. Once the guard bed was at temperature, the feed was switched to the rare gas mixture containing: 150 ppm Xe, 1502 ppm Kr, 1540 ppm $CH_4$, 50 ppm $N_2O$ and balance $O_2$. The flow rate was set at 0.35 slpm. With room temperature feed, the Xe breakthrough to the feed concentration was achieved in about 8 hours. Next the adsorbent bed temperature was decreased from room temperature to 130 K using the cryostat and the flow rate was increased to 2.5 slpm. After decreasing the temperature, the Xe concentration at the exit of the adsorbent bed decreased, indicating more adsorption of the Xe was taking place at this lower, but still gas phase, temperature. After approximately 8 hours at 130 K, breakthrough of the Xe to the feed concentration was once again re-established. At this point, the feed was changed from the rare gas containing mixture to UHP $O_2$, the pressure was reduced to 50 psig and the flow rate was decreased to 0.5 slpm for the purge step. The purge step was continued for 60 minutes before the bed temperature was gradually increased from 130 K to ambient for the step of Xe recovery and bed regeneration. As FIG. 6 demonstrate, no $CH_4$ was detected during the step of Xe recovery, but a small amount of $N_2O$ was released from the adsorbent, most likely as a result of the high flow rate of 2.5 slpm to decrease the overall test time.

The inventive process can also be adapted to recover krypton from a gas or liquid stream containing at least Kr, Xe, $CH_4$ and balance oxygen. FIG. 7 demonstrates one embodiment wherein oxygen is used as the purge gas in Steps 2 and 3 and liquid oxygen is used for bed cooling Step 4. One process variation that allows for the separation of krypton from this gas mixture relies upon the AgX adsorbent having the least affinity for this component compared to methane or xenon. As a result, the breakthrough of the less strongly held krypton occurs first, before methane and/or other hydrocarbons and xenon. Some krypton may therefore be recovered in the period, before unacceptable amounts of methane and/or other hydrocarbons breakthrough. The adsorption process for krypton and xenon recovery involves the following steps:

Step 1a: Stripping Step and Kr Recovery

To an adsorbent bed containing an adsorbent selective for Xe pre-cooled to ≤120 K and preferably to ≤90 K, with a cryogenic oxygen fluid, a feed stream also at ≤120 K and preferably ≤90 K and at a pressure of about 10 psig containing at least ppm levels of Kr, Xe and hydrocarbons in an oxygen matrix is provided to the inlet of the adsorbent bed. The adsorbent which is selective for Xe, enables hydrocarbon/Kr separation during the early part of the stripping step, by adsorbing the hydrocarbon more strongly and allowing the Kr to breakthrough the adsorbent bed first. The Kr can be recovered at this point up until the hydrocarbon content exceeds 10 ppm at the outlet of the adsorbent bed.

Step 1b: Stripping Step

Once the hydrocarbon levels at the outlet exceed 10 ppm, recovery of Kr is ended and the stripping step is continued to gradually saturate the Xe selective AgX adsorbent with Xe as the flow of the feed stream is continued. The feed step is intentionally continued until the Xe concentration at the outlet of the bed is at least 90% and preferably at least 95% of the Xe concentration at the inlet of the bed. At this point, the feed flow is ended.

Step 2: Liquid Oxygen Purge Step

Once the criterion for ending Step 1b of having a Xe concentration at the outlet of the bed of at least 90% of the Xe concentration at the inlet of the bed is achieved, the bed should be purged with a purge gas selected from the group oxygen, nitrogen, argon and mixtures thereof at ≤120 K to remove hydrocarbons and Xe from the non-selective voids present in the adsorbent bed. This purge step should be continued until the hydrocarbon levels at the outlet of the adsorbent bed are ≤50 ppm and preferably ≤10 ppm and most preferably ≤1 ppm.

Step 3: Regeneration and Xe Recovery

At this point, the temperature of the adsorbent bed can be increased from cryogenic temperatures to at least 250 K in order to recover a Xe product in percent levels containing at most 50 ppm hydrocarbon, measured as methane equivalent. The temperature can be raised by using ambient or hotter (up to 450 K) temperature oxygen gas and the purity of the Xe product can be controlled through the amount of this ambient temperature purge gas employed.

Step 4: Bed Cooling

After the temperature of the adsorbent bed reaches at least 250 K and the Xe product has been recovered, the bed must be cooled again to cryogenic temperatures. This is accomplished by stopping the flow of ambient or warmer temperature purge gas and contacting the adsorbent bed with a cryogenic fluid to cool the bed to ≤120 K and preferably to ≤90 K.

Steps 1-4 can be operated cyclically. It is also possible to operate this adsorption process using one or more adsorbent beds. If two adsorption beds are used, it is advantageous to operate the process wherein these two adsorbent beds are out of phase with one another, wherein bed 1 is on Step 1a and 1b, bed 2 is undergoing Steps 2, 3 and 4. It is particularly advantageous to operate the 2-bed process to have bed 2 regenerated, following Steps 2, 3 and 4, before bed 1 has registered any Xe breakthrough. In this way, for a portion of Step 1a and 1b, both beds 1 and 2 can be operated in series to enable the outlet Xe concentration from bed 1 to be greater than 95% of the inlet concentration and at the same time, increase the overall Xe and Kr recovery. A preferred embodiment, as shown in FIG. 7 is to use oxygen for the purge gas in Steps 2 and 3 and liquid oxygen for the cooling fluid in Step 4.

Example 4: Kr Recovery from Feed Liquid Containing 150 ppm Xe, 1500 ppm Kr, 1540 ppm $CH_4$, 50 ppm $N_2O$, Balance $O_2$ The adsorbent bed from Example 1 was packed with 1.83 g of AgLSX (99% exchanged with Ag, on an equivalents basis, balance Na), having an average particle size of 1.0 mm, which only partly filled this bed. The additional space in the bed was filled-up with essentially non-adsorbing glass beads, also having an average particle size of 1.0 mm. The AgLSX adsorbent was activated as described in Example 1, prior to use. As a result of the presence of $N_2O$ in the feed gas, a gel trap containing 3.54 g of Grade 40 Grace Davison Silica Gel was placed before the AgLSX adsorbent bed. This was activated as described in Example 2, prior to use. The system was purged at ambient temperature with UHP $O_2$ to remove any atmospheric contaminants from the adsorbent bed, gel trap and associated components and piping. The pressure was set to 100 psig using the back-pressure regulator. Liquid $N_2$ was then used to cool the gel trap to an average temperature of 81.9 K. The adsorbent bed inside the cryostat (as described in Example 1) was similarly cooled, this time to an average temperature of 85.6 K still under UHP $O_2$ flow. Once the gel trap and adsorbent bed temperatures had stabilized, the feed was switched from UHP $O_2$ to the Xe containing mixture having the following composition: 150 ppm Xe, 1500 ppm Kr, 1540 ppm $CH_4$, 50 ppm $N_2O$, balance $O_2$. The flow rate was 0.5 slpm for the adsorption step. The breakthrough curves for Kr, $CH_4$ and Xe are given in FIG. 8. From the data in this figure, it is clear that the Kr breakthrough occurs before the $CH_4$ breakthrough enabling some Kr recovery, before the $CH_4$ breakthrough occurs.

We claim:

1. An adsorption process for the recovery of xenon from a cryogenic feed stream containing xenon which comprises:
   i. feeding the feed stream at cryogenic temperatures into the inlet of an adsorption vessel having an inlet and an outlet and containing an adsorbent bed therein, wherein said adsorbent bed contains at least one AgX adsorbent selective for xenon,
   ii. maintaining said adsorbent bed on feed until the xenon concentration at the outlet of said bed is greater than or equal to 70% of the xenon concentration at the inlet to said adsorbent bed,
   iii. ending the feed to the adsorption bed and purging same with a purge gas,
   iv. increasing the temperature of said adsorbent bed to a temperature effective to desorb substantially all of said xenon from the adsorbent in said adsorbent bed,
   v. recovering the xenon product desorbed from said adsorbent bed,
   vi. cooling said adsorbent bed to cryogenic temperatures with a cryogenic fluid, and
   repeating steps i.-vi. in a cyclic manner.

2. The process of claim 1 wherein said cryogenic feed stream is an oxygen feed stream which, in addition to xenon, comprises at least one other adsorbable component.

3. The process of claim 2 wherein said at least one other adsorbable component is a hydrocarbon or krypton.

4. The process of claim 3 wherein said hydrocarbon is methane, ethane, ethylene, propane or combinations thereof.

5. The process of claim 4 wherein said at least one other adsorbable component comprises krypton, methane, or both krypton and methane.

6. The process of claim 1 wherein said cryogenic feed stream is in a liquid or gaseous state.

7. The process of claim 1 wherein said feed stream comprises 1-200 ppm xenon, 500-2000 ppm Kr, 500-2000 ppm hydrocarbons, 0-100 ppm $N_2O$, 0-100 ppm $CO_2$, 0-1200 ppm of Ar and ppm amounts of $N_2$ and other atmospheric gases, balance $O_2$.

8. The process of claim 1 wherein said purge gas comprises oxygen, nitrogen and/or argon.

9. The process of claim 8 wherein said purge gas is substantially free of xenon.

10. The process of claim 1 wherein said adsorbent bed of step i. is pre-cooled to a temperature of ≤120K.

11. The process of claim 5 wherein said adsorbent bed of step i. is pre-cooled to a temperature of ≤90K.

12. The process of claim 3 wherein said purge step is continued until the hydrocarbons level at the outlet of said adsorbent bed are ≤50 ppm.

13. The process of claim 3 wherein said purge step is continued until the hydrocarbons level at the outlet of said adsorbent bed are ≤10 ppm.

14. The process of claim 1 wherein in step iv., the temperature of the adsorbent bed is increased from cryogenic temperatures to at least 250 K in order to recover a xenon product at a concentration of ≥1% xenon.

15. The process of claim 12 wherein in step iv. wherein said xenon product contains<50 ppm hydrocarbons.

16. The process of claim 1 wherein in step vi., the adsorbent bed is cooled to a temperature of <120 K.

17. The process of claim 1 wherein said adsorbent bed is maintained on feed until the xenon concentration at the outlet of said bed is greater than or equal to 95% of the xenon concentration at the inlet to said adsorbent bed.

18. The process of claim 1 comprising at least two adsorbent beds wherein said adsorbent beds are out of phase with each other.

19. The process of claim 16 wherein said beds are connected in series for a portion of the feed step.

20. The process of claim 1 wherein oxygen is the purge gas.

21. The process of claim 1 wherein cryogenic oxygen gas and/or liquid oxygen is used as the cryogenic fluid in step vi.

22. The process of claim 1 wherein the ion exchange level is at least 80% Ag on an equivalents basis.

23. The process of claim 22 wherein the ion exchange level of said zeolite is at least 90% Ag on an equivalents basis.

24. The process of claim 3 wherein krypton is recovered from the outlet of the adsorbent bed during step i and the recovery of krypton is continued until either the hydrocarbon concentration in the krypton product reaches 50 ppm or until the xenon concentration at the outlet of the adsorbent bed is greater than or equal to 70% of the xenon concentration at the inlet to said adsorbent bed.

* * * * *